(12) United States Patent
Matsunaga

(10) Patent No.: US 9,992,740 B2
(45) Date of Patent: Jun. 5, 2018

(54) COMMUNICATION DEVICE, PROGRAM STORAGE MEDIUM, AND COMMUNICATION METHOD

(71) Applicant: Oki Electric Industry Co., Ltd., Tokyo (JP)

(72) Inventor: Toshihiko Matsunaga, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 195 days.

(21) Appl. No.: 14/995,201

(22) Filed: Jan. 14, 2016

(65) Prior Publication Data
US 2016/0212704 A1 Jul. 21, 2016

(30) Foreign Application Priority Data
Jan. 21, 2015 (JP) .................................. 2015-009666

(51) Int. Cl.
*G01R 31/08* (2006.01)
*H04L 12/28* (2006.01)
(Continued)

(52) U.S. Cl.
CPC ... *H04W 52/0216* (2013.01); *H04W 52/0229* (2013.01); *H04W 52/0238* (2013.01);
(Continued)

(58) Field of Classification Search
CPC ............. H04W 52/0219; H04W 52/04; H04W 56/0005; H04W 72/121
See application file for complete search history.

(56) References Cited

U.S. PATENT DOCUMENTS

2002/0024974 A1* 2/2002 Karagiannis .......... H04L 45/302
370/516
2007/0132747 A1* 6/2007 Endo .................... G09G 3/3275
345/204

(Continued)

OTHER PUBLICATIONS

IEEE Standard for Local and metropolitan area networks—Part15. 4:Low-Rate Wireless Personal Area Networks (LR-WPANs), IEEE Std 802.15.4e-2012, Apr. 16, 2012.

*Primary Examiner* — Faruk Hamza
*Assistant Examiner* — Abu-Sayeed Haque
(74) *Attorney, Agent, or Firm* — Rabin & Berdo, P.C.

(57) ABSTRACT

There is provided a communication device including (1) a communication controller that causes a control frame for synchronization to be transmitted during a control frame transmission period to a transmission destination of a data frame such that the data frame is transmitted after transmission of the control frame has completed, (2) a transmission section that continuously transmits the control frame for the control frame transmission period, (3) a reception section that receives a frame transmitted by a communication device of the transmission destination, (4) a control frame transmission information saving section that saves information for respective destination addresses, (5) a control frame transmission controller that references the information saved in the control frame transmission information saving section, and determines the control frame transmission period for when to transmit the next control frame, based on the control frame transmission period from the past and the data frame transition result.

14 Claims, 9 Drawing Sheets

(51) Int. Cl.
*H04J 3/16* (2006.01)
*H04W 52/02* (2009.01)
*H04W 56/00* (2009.01)
*H04W 72/12* (2009.01)
*H04W 28/06* (2009.01)

(52) U.S. Cl.
CPC ... *H04W 56/0015* (2013.01); *H04W 72/1205* (2013.01); *H04W 28/06* (2013.01); *Y02B 60/50* (2013.01)

(56) References Cited

U.S. PATENT DOCUMENTS

| | | | |
|---|---|---|---|
| 2007/0201461 A1* | 8/2007 | Shinohara | H04L 45/00 370/389 |
| 2010/0050262 A1* | 2/2010 | Knapp | H04L 63/1466 726/25 |
| 2010/0278087 A1* | 11/2010 | Kawakami | H04W 52/0216 370/311 |
| 2011/0069656 A1* | 3/2011 | Choi | H04B 7/2656 370/328 |
| 2013/0107999 A1* | 5/2013 | Mainaud | H04J 3/0638 375/362 |
| 2013/0235878 A1* | 9/2013 | Hirota | H04L 7/00 370/412 |
| 2015/0156736 A1* | 6/2015 | Guo | H04W 56/001 370/350 |
| 2015/0156738 A1* | 6/2015 | Guo | H04W 56/002 709/236 |
| 2016/0337115 A1* | 11/2016 | Lu | H04L 12/4035 |

* cited by examiner

FIG.4

| TIME | DESTINATION ADDRESS | CSL PHASE (MILLISECONDS) | TRANSITION END TIME | WAKEUP FRAME TRANSMISSION PERIOD (MILLISECONDS) |
|---|---|---|---|---|
| ts1 | 2222 | - | ts1 | 10 |
| ts2 | 2222 | 0 | ts2 | 20 |
| ts3 | 2222 | 0 | ts3 | 10 |
| ts4 | 2222 | 0 | ts4 | 10 |

FIG.9

| TIME | DESTINATION ADDRESS | PREVIOUS TRANSMISSION SEPARATION (MINUTES) | CSL PHASE (MILLISECONDS) | TRANSITION END TIME | WAKEUP FRAME TRANSMISSION PERIOD (MILLISECONDS) |
|---|---|---|---|---|---|
| ts1 | 2222 | - | - | ts1 | - |
| ts2 | 2222 | - | 1 | ts2 | 10 |
| ts3 | 2222 | - | 4 | ts3 | 10 |
| ts4 | 2222 | - | 2 | ts4 | 20 |
| ts5 | 2222 | - | 0 | ts5 | 10 |
| ts6 | 2222 | 30 | - | ts6 | 10 |
| ts7 | 2222 | 30 | 1 | ts7 | 10 |
| ts8 | 2222 | 60 | 2 | ts8 | 10 |
| ts9 | 2222 | 60 | 4 | ts9 | 20 |
| ts10 | 2222 | 90 | 0 | ts10 | 40 |

COMMUNICATION DEVICE, PROGRAM STORAGE MEDIUM, AND COMMUNICATION METHOD

CROSS-REFERENCE TO RELATED APPLICATION

This application claims priority under 35 USC 119 from Japanese Patent application No. 2015-009666, filed on Jan. 21, 2015, the disclosure of which is incorporated by reference herein.

BACKGROUND

Technical Field

The present disclosure relates to a communication device, program storage medium, and method, applicable, for example, to a communication device that receives frames intermittently.

Related Art

For example, IEEE802.15.4 defines various additional functionality for a MAC layer, and includes coordinated sampled listening (CSL) technology as one intermittent reception method for receiving frames intermittently in order to achieve savings in power (see, IEEE Std 802.15.4e™-2012 (IEEE Standard for Local and metropolitan area networks Part 15.4: Low-Rate Wireless Personal Area Networks (LR-WPANs) Amendment 1: MAC sublayer) 5.1.11.1 Coordinated sampled listening (CSL) (referred to below as IEEE document)).

Simple explanation follows of a procedure for data frame communication between a transmitter and a receiver including CSL compatible communication devices.

The transmitter attempting to transmit a signal including data frames, first, in an asynchronous transmission mode, continuously transmits a signal including a wakeup frame prescribing a data frame transmission start timing (rendezvous time) during maximum CSL reception periods (max CSL Period), and then the transmitter transmits the data frame after the period of time of the max CSL reception period has elapsed.

The receiver adopts a state of awaiting reception only for the duration of wakeup frame reception segments in the CSL reception periods, and does not perform reception actions at other times. If the receiver is able to receive wakeup frames while awaiting reception, then data frames can be received from the transmitter by transitioning to the state of awaiting reception immediately prior to the rendezvous time.

When an acknowledgement (ACK) is requested in return for receipt of the data frame, the receiver returns an ACK including the CSL reception period of the receiver and the rendezvous time that is in the received wakeup frame (namely, a CSL phase indicating the misalignment between a timing of synchronization information in the wakeup frame and a reception timing).

If the transmitter has not received an ACK from the receiver, the transmitter re-transmits the wakeup frame and the data frame to the receiver in the asynchronous communication mode at the next data frame transmission timing.

On the other hand, the transmitter has received an ACK from the receiver, the transmitter saves the CSL reception period and the CSL phase of the receiver, and performs synchronization correction with the receiver. Then, when transmitting the next data frame, the transmitter transmits the wakeup frame and the data frame in synchronous communication mode at the corrected transmission timing.

In the IEEE document, there is no particular stipulation of the number of times for transmitting the wakeup frame when in the synchronous communication mode. The number of times that the wakeup frame is transmitted in periods of synchronous communication can be much less than in periods of asynchronous communication, and this is preferable. This is because it is sufficient to transmit the wakeup frame only the number of times that enables synchronization correction. For example, say the wakeup frame transmission period in the asynchronous communication mode is 1000 milliseconds, then the wakeup frame transmission period in the synchronous communication mode can be set at from $\frac{1}{100}$ to $\frac{1}{10}$ of that in the asynchronous communication mode, so as to be, for example, 100 milliseconds or less. For example, suppose the transmitter transmits the wakeup frame three times, and synchronization is achieved as an ACK response of the CSL phase is recognized in the second frame. In this event, it can be determined that the receiver side is behind if the ACK response is in the first frame, and the receiver side is ahead if the ACK response is in the third frame.

However, if the wakeup frame transmission period is short, then it is possible that transmission of the data frame fails even if there is only a slight synchronization misalignment between the transmitter and the receiver.

Moreover, since the wakeup frame transmission period is much longer in the asynchronous communication mode than in the synchronous communication mode, frequent occurrences of frame transmission when in asynchronous communication lead to power consumption in the transmitter, and are liable to greatly increase the communications load on the overall network.

Thus the present disclosure provides a communication device, program storage medium, and method to achieve a shorter control frame transmission period (wakeup frame transmission period) in total, while synchronous communication is maintained.

SUMMARY

A communication device of the present disclosure includes: a communication controller that causes a control frame, which is a frame employed for the purpose of achieving synchronization, to be transmitted during a control frame transmission period, which is a period of time in which the control frame transmission is permitted, to a transmission destination of a data frame such that the data frame is transmitted after transmission of the control frame has completed; a transmission section that, under instruction from the communication controller, continuously transmits the control frame for the control frame transmission period; a reception section that receives a frame transmitted by a communication device of the transmission destination; a control frame transmission information saving section that saves information including at least the control frame transmission period in which the control frame was transmitted, and a transmission result of the data frame, for respective destination addresses; and a control frame transmission controller that references the information saved in the control frame transmission information saving section, and determines the control frame transmission period for when to transmit the next control frame, based on the control frame transmission period from the past and the data frame transition result.

Moreover, the communication device of the present disclosure is a communication device that continuously transmits a control frame, which is a frame employed for the purpose of achieving synchronization with another communication device at a reception side that intermittently receives data frames, during a predetermined control frame transmission period prior to transmission of the data frame, and includes: (1) a communication controller that causes a control frame to be transmitted for a control frame transmission period, to a request destination for a data frame such that the data frame is transmitted after transmission of the control frame has completed; (2) a transmission section that transmits the control frame or the data frame; (3) a reception section that receives a frame transmitted by the other communication device; (4) a control frame transmission information saving section that saves at least the control frame transmission period in which the control frame was transmitted for each time a data frame is transmitted, and a transmission result of the data frame, for respective destination addresses; and (5) a control frame transmission controller that references the information saved in the control frame transmission information saving section, and determines the next control frame transmission period, based on the control frame transmission period from the past and the data frame transition result.

A non-transitory computer-readable medium of the present disclosure is recorded with a communication program for continuously transmitting, during a predetermined control frame transmission period, a control frame for achieving synchronization, prior to transmitting a data frame, with another communication device on the reception side that intermittently receives data frames. The communication program causing a computer to function as: (1) a communication controller that causes a control frame to be transmitted for a control frame transmission period to a request destination for a data frame such that the data frame is transmitted after transmission of the control frame has completed; (2) a transmission section that transmits the control frame or the data frame; (3) a reception section that receives a frame transmitted by the other communication device; (4) a control frame transmission information saving section that saves at least the control frame transmission period in which the control frame was transmitted for each time a data frame is transmitted, and a transmission result of the data frame, for respective destination addresses; and (5) a control frame transmission controller that references the control frame transmission information saving section, and determines the next control frame transmission period, based on the control frame transmission period from the past and the data frame transition result.

A communication method of the present disclosure is a communication method for continuously transmitting, for a predetermined control frame transmission period, a control frame for achieving synchronization with another communications device on the reception side that intermittently receives data frames prior to transmitting the data frame, in the communication method (1) a communication controller causes a control frame, which is a frame employed for the purpose of achieving synchronization, to be transmitted for a control frame transmission period to a request destination for a data frame such that the data frame is transmitted after transmission of the control frame has completed; (2) a transmission section transmits the control frame or the data frame; (3) a reception section receives a frame transmitted by the other communication device; (4) a control frame transmission information saving section saves at least the control frame transmission period in which the control frame was transmitted for each time a data frame is transmitted, and a transmission result of the data frame, for respective destination addresses; and (5) a control frame transmission controller references the control frame transmission information saving section, and determines the next control frame transmission period, based on the control frame transmission period from the past and the data frame transition result.

The present disclosure enables a shorter control frame transmission period in total to be achieved, while synchronous communication is maintained.

BRIEF DESCRIPTION OF THE DRAWINGS

Exemplary embodiments of the present disclosure will be described in detail based in the following figures, wherein:

FIG. 4 is an explanatory diagram to explain a configuration of synchronized frame transmission information for a reception node (node B) of a transmission node (node A) in FIG. 3;

FIG. 9 is an explanatory diagram to explain a configuration of synchronized frame transmission information for a reception node (node B) of a transmission node (node A) in FIG. 7 and FIG. 8.

DETAILED DESCRIPTION (A) First Exemplary Embodiment

Detailed explanation follows regarding a first exemplary embodiment of a communication device, program storage medium, and method according to the present disclosure, with reference to the drawings.

The first exemplary embodiment is an example of an embodiment of the present disclosure applied to a communication device in which CSL is employed as an intermittent reception method.

(A-1) Configuration of First Exemplary Embodiment

Figure 1:
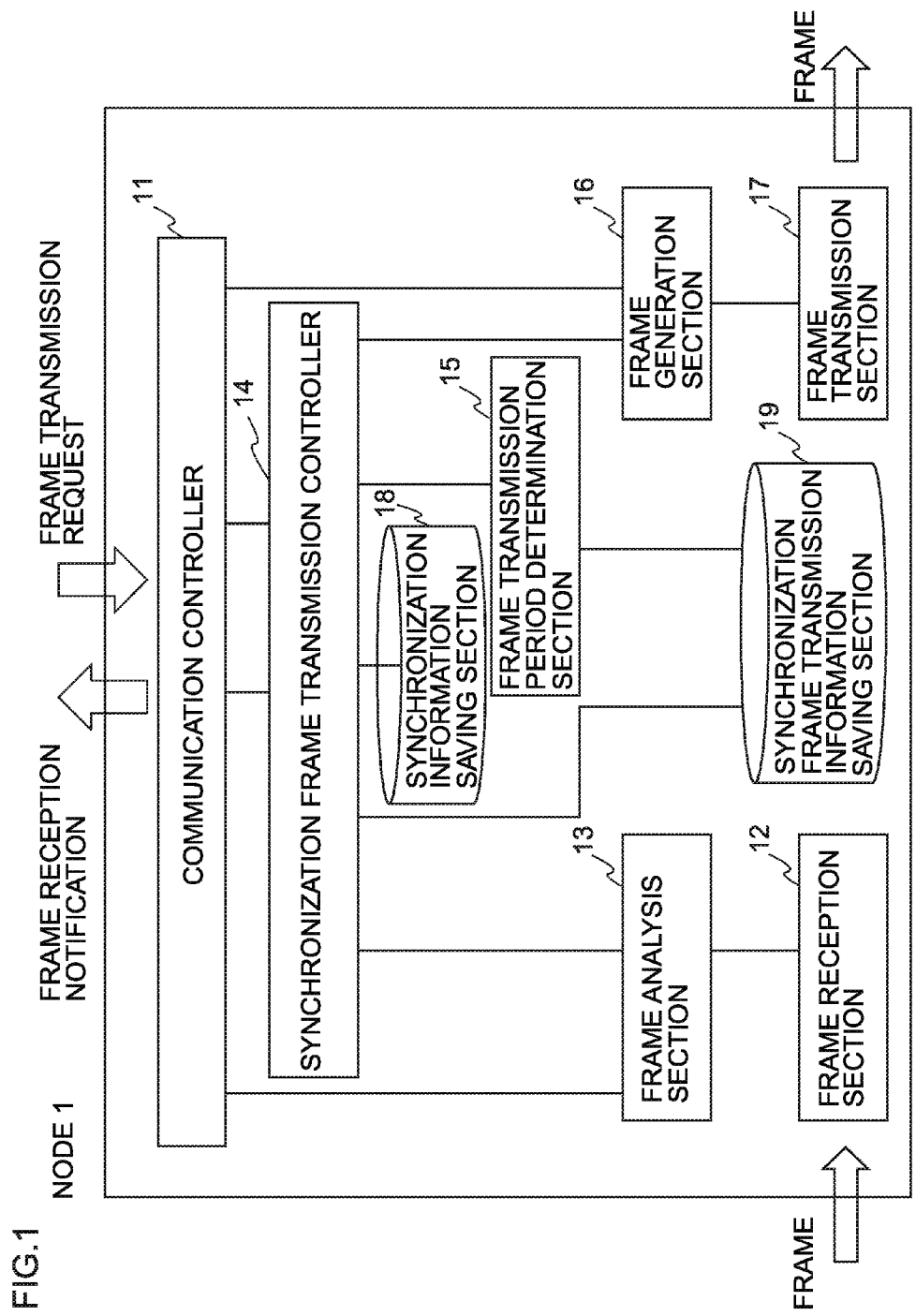
FIG. 1 is a block diagram illustrating an internal configuration of a communication device according to a first exemplary embodiment.

FIG. 1 is a block diagram illustrating an internal configuration of a communication device according to the first exemplary embodiment. FIG. 1 illustrates a communication device 1 according to the first exemplary embodiment including a communication controller 11, a frame reception section 12, a frame analysis section 13, a synchronization frame transmission controller 14, a frame transmission period determination section 15, a frame generation section 16, a frame transmission section 17, a synchronization information saving section 18, and a synchronization frame transmission information saving section 19.

The communication device 1 is, for example, installed in a node that transmits and receives information with a corresponding node. The node includes a communication function and, for example, may be applied to a transceiver that transmits and receives sensor data, a relay device that relays data frames (including gateways, routers, switching devices, and the like), a personal computer, a smartphone, a tablet terminal, a mobile terminal, a wearable terminal, or the like. A device including a CPU, ROM, RAM, EEPROM, a communication interface, and the like is applicable as the hardware of the communication device 1, and the CPU may implement various functions by using required data to execute a processing program stored in the ROM. The processing program for the various functions of the communication device 1 may be implemented by being installed, and the processing program may also be expressed by the processing blocks illustrated in FIG. 1 in such cases.

The communication controller 11 controls the frame transmission and reception processing. The communication controller 11 employs, for example, a power saving wireless communication method as defined in IEEE Std 802.15.4e, and employs CSL as an intermittent reception method.

When there is a request from the layer above to transmit data frames, the communication controller 11 provides address information of a destination node related to the transmission request to the synchronization frame transmission controller 14. On receipt of a wakeup frame transmission communication completion notification from the synchronization frame transmission controller 14, the communication controller 11 passes to the frame transmission section 17 a transmission request for data frames appended with the address of the requested destination node. The communication controller 11 also passes frame transmission results from the synchronization frame transmission controller 14, and analysis result information of received frames from the frame analysis section 13, to the layer above.

The frame reception section 12 receives frames from a connected network, and passes the received frames to the frame analysis section 13.

The frame analysis section 13 analyzes the received frame acquired from the frame reception section 12, determines whether or not the transmission location of the received frame is its own node address, and sends notification to the communication controller 11 and the synchronization frame transmission controller 14 of receipt of the received frame if it is a received frame of its own node address.

When the synchronization frame transmission controller 14 has acquired from the communication controller 11 the destination address related to the data frame transmission request, based on the destination address, the synchronization frame transmission controller 14 reads the synchronization frame transmission information saved in the synchronization frame transmission information saving section 19, and determines whether or not there is synchronization with the destination node. Depending on the determination result as to whether or not there is synchronization with the destination node, the synchronization frame transmission controller 14 also continuously sends a wakeup frame transmission request to the frame generation section 16 for a wakeup frame transmission period determined by the frame transmission period determination section 15.

The wakeup frame is a frame for synchronizing with the communication device at the destination in preparation for the data frame, and includes a rendezvous time (RZ Time) indicating the remaining time until the data frame transmission timing.

When transmission of the wakeup frame has been completed during the wakeup frame transmission period, the synchronization frame transmission controller 14 passes a wakeup frame transmission complete notification to the communication controller 11.

The frame transmission period determination section 15 employs the information saved in the synchronization frame transmission information saving section 19 to determine whether or not the previous frame transmission has been successful for each destination address, and confirms or changes the wakeup frame transmission period for each of the destination addresses.

The method of computing the wakeup frame transmission period by the frame transmission period determination section 15 is based on the success or failure of the previous frame transmission saved in the synchronization frame transmission information saving section 19. Namely, the wakeup frame transmission periods for each of the destination addresses are saved in the synchronization frame transmission information saving section 19. An initial value may be set for the first wakeup frame transmission period. The frame transmission period determination section 15 reads the previous wakeup frame transmission period corresponding to the address information of the destination node, and determines the next wakeup frame transmission period.

If the previous frame transmission succeeded (when there has been receipt of an ACK frame from the destination node), the frame transmission period determination section 15 references the previous wakeup frame transmission period, and determines the next wakeup frame transmission period. The frame transmission period determination section 15 also, when necessary, shortens the next wakeup frame transmission period, or sets it to the same value.

On the other hand, when the previous frame transmission failed (when a ACK frame has not been received from the destination node), the frame transmission period determination section 15 changes the next wakeup frame transmission period such that the duration of the wakeup frame transmission period for the destination node is longer than it was the previous time. For example, the frame transmission period determination section 15 updates the next wakeup frame transmission period to a value of the previous wakeup frame transmission period multiplied by a predetermined factor. This thereby enables the possibility of reception of the wakeup frame by the corresponding node (the reception node) to be raised. However, the next wakeup frame transmission period remains set to a shorter period of time than the wakeup frame transmission period during asynchronous communication.

In this exemplary embodiment, in order to extend the next wakeup frame transmission period in cases in which the previous frame transmission to the destination address failed, the value of the current wakeup frame transmission period multiplied by the predetermined value (namely, a period of time that is multiplied by a predetermined factor) is employed as the next wakeup frame transmission period. However, it is sufficient that the wakeup frame transmission period can be extended, and so a longer wakeup frame transmission period may be computed by adding a predetermined period of time, or by employing a predetermined calculation equation.

When receiving a transmission request from the communication controller 11, the frame generation section 16 generates a transmission frame, and passes the generated frame to the frame transmission section 17.

The frame transmission section 17 transmits the frame generated by the frame generation section 16 to the network.

The synchronization information saving section 18 saves the synchronization information, such as the CSL phase and the transmission end timing, for each destination node address.

The synchronization frame transmission information saving section 19 saves information related to the correlation between wakeup frame transmission periods under respective conditions. For example, the synchronization frame transmission information describes content indicating that the wakeup frame transmission period is 50 milliseconds for a single occurrence of transmission error, and is 100 milliseconds when there are two consecutive transmission errors.

A common section may be employed as the synchronization information saving section 18 and the synchronization frame transmission information saving section 19. Namely, configuration may be made such that the content of the synchronization frame transmission information saving section 19 is managed for all of the individual destination addresses. For example, the destination addresses, synchronization information of the CSL phase, the transmission end timing, and the wakeup frame transmission period may be written as illustrated in FIG. 4.

(A-2) Operation of the First Exemplary Embodiment

Next, detailed explanation follows regarding operation of frame transmission processing in the communication device 1 according to the first exemplary embodiment, with reference to the drawings.

Figure 2:
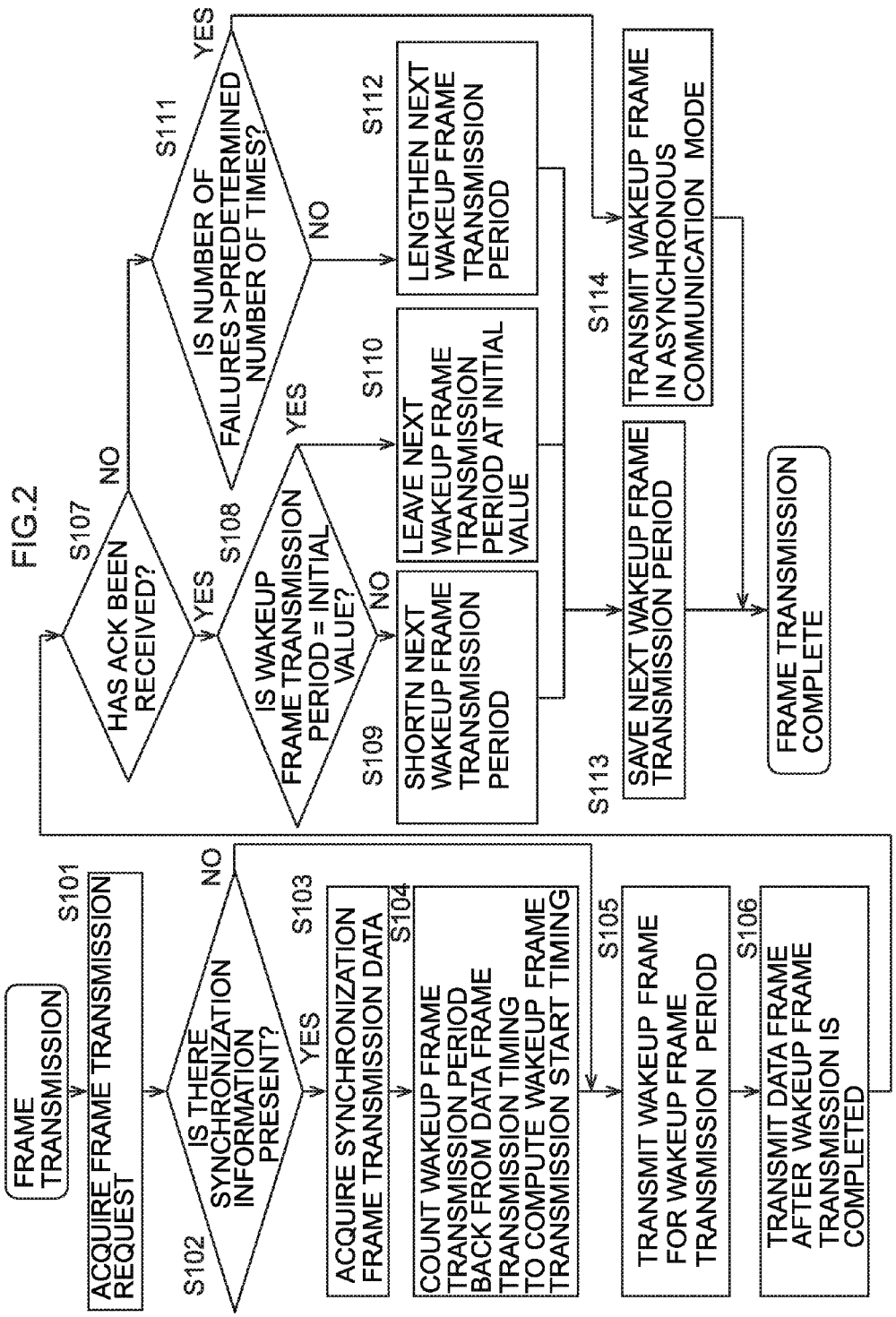
FIG. 2 is flowchart illustrating operation of frame transmission processing in a communication device according to the first exemplary embodiment.

FIG. 2 is a flowchart illustrating the operation of frame transmission processing in the communication device 1 according to the first exemplary embodiment.

In FIG. 2, when a frame transmission request to a destination node of data is sent from the layer above to the communication controller 11 (S101), the communication controller 11 starts the frame transmission processing for the destination node.

The address information of the destination node (referred to below as the destination address) according to the frame transmission request is sent from the communication controller 11 to the synchronization frame transmission controller 14. The synchronization frame transmission controller 14 searches for the presence or absence of corresponding synchronization information in the synchronization information saving section 18 based on the acquired destination address (S102). Namely, confirmation is made as to whether or not a synchronized state has been achieved with the node of the destination address. Then the processing transitions to S103 when synchronization information is present, and the processing transitions to S105 when synchronization information is not present.

For example, the CSL phase indicating the synchronization misalignment time between the current node and the destination node is saved in the synchronization information saving section 18 for each destination address. Namely, when the CSL phase has been acquired from the destination node in the previous frame transmission processing, this CSL phase is associated with the respective destination address and saved in the synchronization information saving section 18. When no CSL phase has been acquired from the destination node, since the CSL phase cannot be saved associated with the destination address, the corresponding entry is, for example, left blank.

When there is synchronization information (CSL phase) associated with the destination address in the synchronization information saving section 18, the synchronization frame transmission information corresponding to the respective destination address is acquired by the synchronization frame transmission controller 14 from the synchronization frame transmission information saving section 19 (S103).

The CSL phase acquired from the previous destination node, the transmission end timing, and the wakeup frame transmission period, are associated with the destination address and saved in the synchronization frame transmission information saving section 19. The synchronization frame transmission controller 14 accordingly extracts the CSL phase, the transmission end timing, and the wakeup frame transmission period from the read synchronization frame transmission information.

At S104, the next data frame transmission timing is computed by the synchronization frame transmission controller 14 based on the CSL phase and the transmission end timing indicating the time of synchronization misalignment with the destination node. Then, the wakeup frame transmission start timing is computed by counting the wakeup frame transmission period included in the synchronization frame transmission information back from next the data frame transmission time (S104).

Notification of a wakeup frame transmission request for the destination node is continuously sent from the synchronization frame transmission controller 14 to the frame generation section 16 for the wakeup frame transmission period from the transmission start timing of the wakeup frame computed by the synchronization frame transmission controller 14. Receiving this notification, the frame generation section 16 generates a wakeup frame appended with the respective destination address, and this wakeup frame is transmitted from the frame transmission section 17 (S105).

Note that configuration may be made such that even when there is no synchronization information present at step S102, the synchronization frame transmission controller 14 still continuously sends, from the current time, a wakeup frame transmission request for a wakeup frame transmission period set to an initial value. Namely, an initial value for the wakeup frame transmission period is set in the synchronization information saving section 18 even for cases in which the CSL phase is not acquired from the destination node.

The initial value of the wakeup frame transmission period is a shorter period of time than a conventional wakeup frame transmission period employed during asynchronous transmission (the max CSL Period). This thereby enables the transmission of the wakeup frame to be performed for a shorter period of time than the conventional wakeup frame transmission period employed during asynchronous transmission.

When transmission of the wakeup frame is complete, a wakeup frame transmission complete notification is sent from the synchronization frame transmission controller 14 to the communication controller 11. When this occurs, the communication controller 11 causes the frame generation section 16 to generate a data frame. A data frame appended with an ACK request is accordingly generated by the frame generation section 16, and the data frame appended with the ACK request is transmitted from the frame transmission section 17 (S106). When this is performed, the communication controller 11 causes the data frame to be transmitted at a timing that has been synchronization corrected based on the CSL phase of the destination node and the transmission end timing.

The communication controller 11 determines whether or not there was a response with an ACK frame from the destination node during a predetermined period of time after transmission of the data frame (S107).

The ACK frame from the destination node includes at least a CSL reception period (CSL Period) and CSL phase of the corresponding node (destination node). The synchronization frame transmission controller 14 saves the CSL reception period and the CSL phase included in the received ACK frame and the transmission timing for the next data frame as the transmission end timing, and saves the synchronization information associated with the corresponding destination address as the synchronization frame transmission information.

If the ACK frame is received, the frame transmission period determination section 15 determines that transmission of the current frame succeeded, and updates the wakeup frame transmission period in the synchronization frame transmission information of the synchronization frame transmission information saving section 19. When this is performed, the frame transmission period determination section 15 updates the respective wakeup frame transmission period such that the next wakeup frame transmission period to the destination node is shorter.

For example, as illustrated in the example in FIG. 2, the frame transmission period determination section 15 determines whether or not the wakeup frame transmission period is the initial value (S108), and shortens the next wakeup frame transmission period in cases in which the wakeup frame transmission period is not the initial value (S109). In cases in which the wakeup frame transmission period is the initial value, the frame transmission period determination section 15 leaves the next wakeup frame transmission period set to the initial value (S110). The frame transmission period determination section 15 then saves the next wakeup frame transmission period in the synchronization frame transmission information saving section 19 (S113).

The method of shortening the wakeup frame transmission period may, for example, be to set the wakeup frame transmission period to the initial value, or, for example, may be to subtract a predetermined value from the current wakeup frame transmission period, or divide the current wakeup frame transmission period by a predetermined value. Since frame transmission processing with the next destination node has succeeded, data frames can be transmitted in synchronization with the destination node as long as the destination node can at least be activated in the next wakeup frame transmission period. Therefore, in order to make the wakeup frame transmission period as short as possible, configuration is made such that the wakeup frame is transmitted for the next wakeup frame transmission period, or for a shorter period of time.

When the ACK frame has not been received, the frame transmission period determination section 15 determines that the next frame transmission has failed. The frame transmission period determination section 15 determines whether or not the number of times the ACK frame has not been received (namely, the number of times frame transmission has failed) exceeds a predetermined number of times (S111). Then, if the number of failures is less than a predetermined number, the frame transmission period determination section 15 extends the next wakeup frame transmission period so as to be a longer period of time than the previous wakeup frame transmission period (S112). Then the frame transmission period determination section 15 saves the next wakeup frame transmission period in the synchronization frame transmission information saving section 19 (S113).

If the number of failure times has exceeded the predetermined number of times, similarly to in a conventional configuration, the wakeup frame and the data frame transmission is performed in the asynchronous transmission mode. It is conventional for transmission of the wakeup frame and the data frame to be performed in the asynchronous communication mode when there is no ACK frame response from the receiving node in this manner. However, in the present exemplary embodiment, even when there is no ACK frame response, immediate transition is not made to the asynchronous transmission mode, transmission of the wakeup frame and the data frame is repeatedly performed in the synchronous transmission mode for a successive predetermined number of times without immediate transition to the asynchronous transmission mode, and transition is made to the asynchronous transmission mode when the predetermined number of times has been exceeded. Note that the predetermined number of times may be appropriately set or varied, and may, for example, be set at five times.

Figure 3:
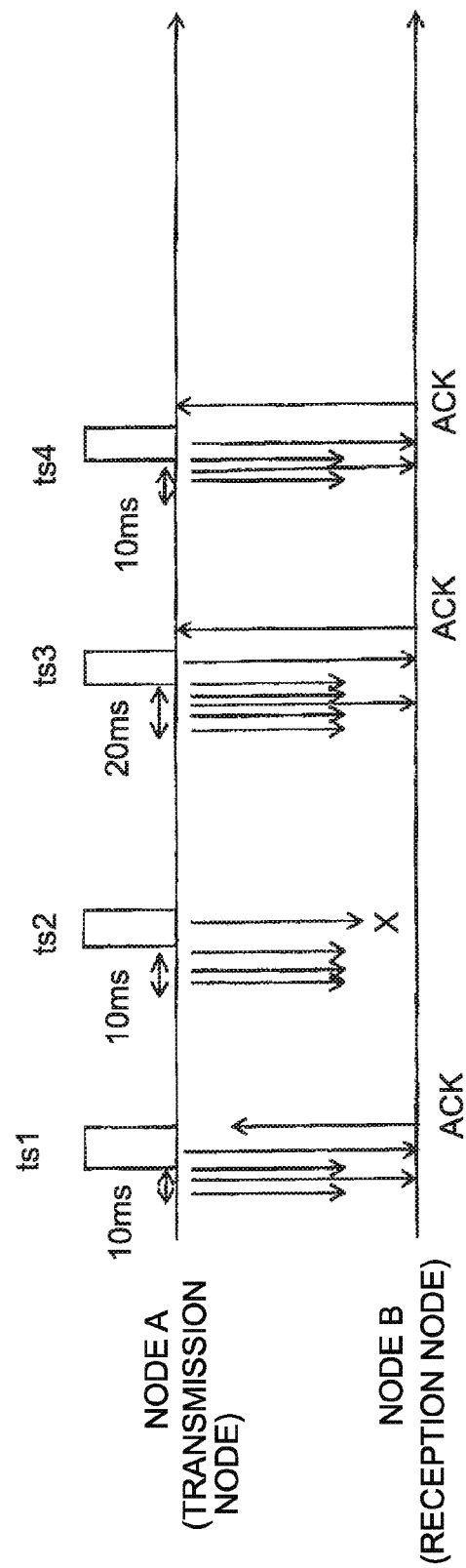
FIG. 3 is an explanatory diagram to explain processing to change a wakeup frame transmission period according to the first exemplary embodiment.

FIG. 3 is an explanatory diagram to explain processing to change the wakeup frame transmission period according to the first exemplary embodiment. FIG. 4 is an explanatory diagram to explain a configuration of synchronization frame transmission data for the transmission node (node A) and the reception node (node B) of FIG. 3.

The address of the node B (reception node) is "2222" in FIG. 3 and FIG. 4. Moreover, the initial value of the wakeup frame transmission period is 10 milliseconds.

In FIG. 3 and FIG. 4, the node A does not receive the ACK frame from the node B prior to a timing ts1. At the timing ts1, the node A receives the ACK frame from the node B. When this occurs, the frame transmission period determination section 15 updates the wakeup frame transmission period to the initial value (in this case, for example, 10 milliseconds), and saves the updated wakeup frame transmission period in the synchronization frame transmission information.

At a timing ts2, the synchronization frame transmission controller 14 reads the previous wakeup frame transmission period (namely, at timing ts1) from the synchronization frame transmission information, and causes the wakeup frame to be continuously transmitted for the previous wakeup frame transmission period of 10 milliseconds. Say, as illustrated in FIG. 3, the ACK frame was not received from the node B at the timing ts2. When this occurs, the frame transmission period determination section 15 doubles the 10 milliseconds of the previous wakeup frame transmission period so as to lengthen the duration of the wakeup frame transmission period, extending (updating) the next wakeup frame transmission period to 20 milliseconds, and then saves the updated wakeup frame transmission period in the synchronization frame transmission information.

At timing ts3, the synchronization frame transmission controller 14 reads the previous wakeup frame transmission period (namely, at timing ts2) from the synchronization frame transmission information, and causes the wakeup frame to be continuously transmitted for the previous wakeup frame transmission period of 20 milliseconds. Since an error in the 10 millisecond wakeup frame transmission occurred at timing ts2, if the next wakeup frame transmission (at timing ts3) were also to be transmitted for 10 milliseconds, then there would be a high probability of the ACK frame not being received, and an error occurring. Thus transmitting the wakeup frame for a 20 millisecond wakeup frame transmission period facilitates achieving synchronization of the node A with the node B. When an ACK frame is received from the node B at timing ts3, the frame transmission period determination section 15 shortens the length of the period of time of the wakeup frame transmission period to the initial value, and saves the updated wakeup frame transmission period in the synchronization frame transmission information.

At timing ts4, the synchronization frame transmission controller 14 reads the previous wakeup frame transmission period (namely, at timing ts3) from the synchronization frame transmission information, and causes the wakeup frame to be continuously transmitted for the previous wakeup frame transmission period of 10 milliseconds.

Thus as explained above, according to the first exemplary embodiment, by lengthening the wakeup frame transmission period during transmission of the next frame when there is a frame transition error, the probability of frame transmission success is raised even in cases in which the synchronization correction has not been achieved, or the frame transmission timing has temporarily been shifted forward or backward due to the surrounding environment, and the probability of transitioning to the asynchronous communication mode is reduced. As a result, the number of frame transmissions can be reduced in total.

(B) Second Exemplary Embodiment

Next, detailed explanation follows regarding a second exemplary embodiment of a communication device, program storage medium, and method according to the present disclosure, with reference to the drawings.

(B-1) Configuration of the Second Exemplary Embodiment

Figure 5:
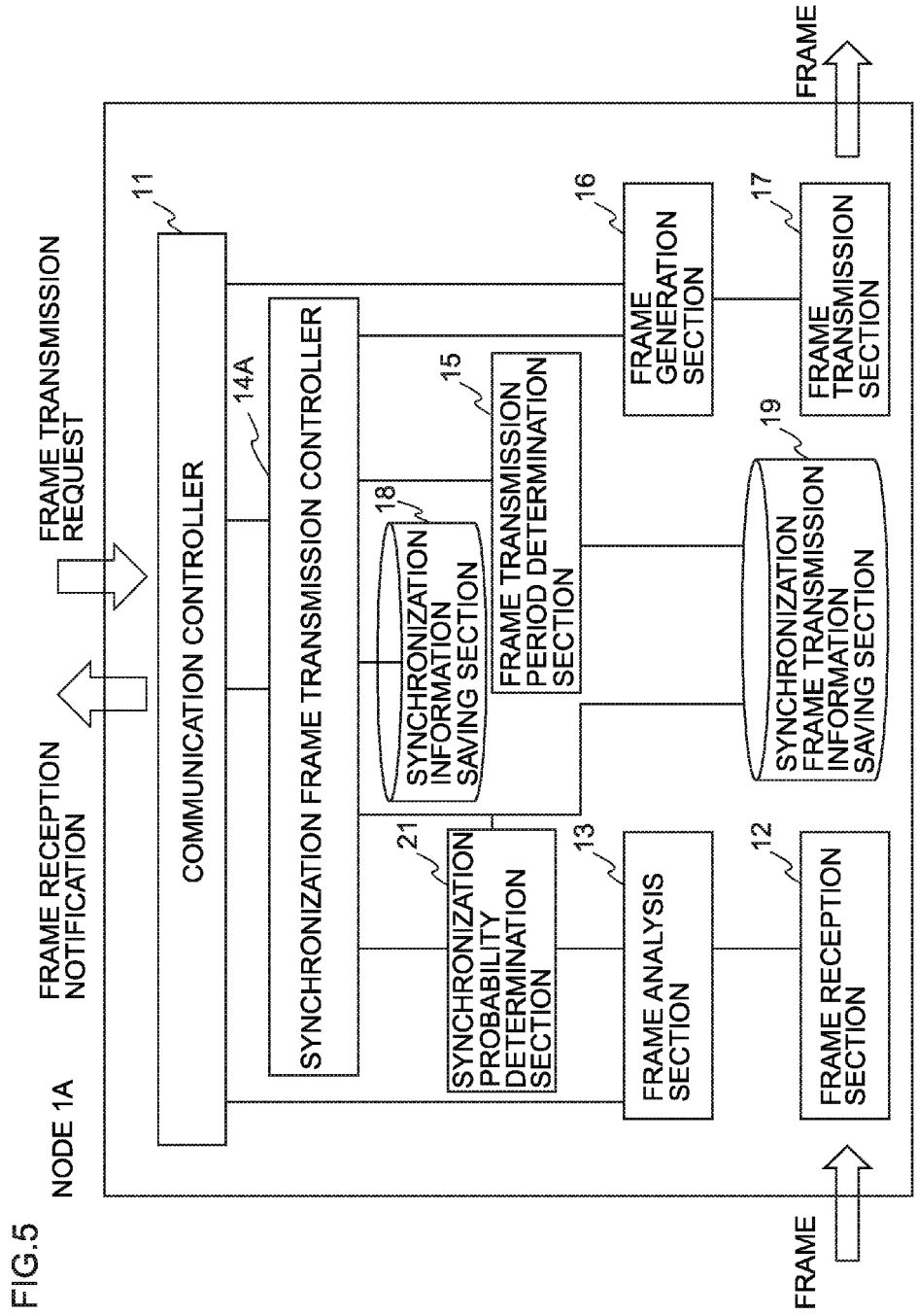
FIG. 5 is a block diagram illustrating an internal configuration of a communication device according to a second exemplary embodiment.

FIG. 5 is a block diagram illustrating an internal configuration of a communication device according to the second exemplary embodiment. FIG. 5 illustrates a communication device 1A according to the second exemplary embodiment including a communication controller 11, a frame reception section 12, a frame analysis section 13, a synchronization frame transmission controller 14A, a frame transmission period determination section 15, a frame generation section 16, a frame transmission section 17, a synchronization information saving section 18, a synchronization frame transmission information saving section 19, and a synchronization probability determination section 21. The communication device 1A according to the second exemplary embodiment includes the synchronization probability determination section 21 in addition to the internal configuration of the communication device 1 in FIG. 1 according to the first exemplary embodiment.

The synchronization frame transmission controller 14A, similarly to the first exemplary embodiment, computes the wakeup frame transmission period, and requests transmission of a wakeup frame by the frame generation section 16 for this wakeup frame transmission period. The synchronization frame transmission controller 14A, finds the length of the period of time from the transmission end timing of the previous data frame until the transmission time of the data frame this time (this is also called the data frame transmission separation) from the synchronization information saved in the synchronization information saving section 18, and the transmission end timing of the previous data frame. The synchronization frame transmission controller 14A then compares the previous transmission separation saved as synchronization information at the point in time when the data frame was transmitted the previous time, against the current data frame transmission separation, and then changes the wakeup frame transmission period according to the comparison result.

The synchronization frame transmission controller 14A also changes the next wakeup frame transmission period according to the comparison result between the amount of synchronization misalignment determined by the synchronization probability determination section 21 and a threshold value.

The synchronization probability determination section 21 calculates a predicted value of a synchronization misalignment range, and sends the predicted value of the synchronization misalignment range to the synchronization frame transmission controller 14A. The method of calculating the predicted value of the synchronization misalignment range is by determining the synchronization misalignment state from whether or not an ACK frame has been received, or from the CSL phase. Namely, when the ACK frame has been received, the synchronization probability determination section 21 extracts the CSL phase included in the received ACK frame and determines the synchronization misalignment state. The synchronization misalignment state is found, from the extracted CSL phase, as a synchronization misalignment amount of how much misalignment occurs from a timing that maximizes synchronization.

The previous data frame transmission separation is saved for each destination address as the synchronization frame transmission information saved in the synchronization frame transmission information saving section 19. The maximum data frame transmission separation during synchronous communication may be saved instead of the previous data frame transmission separation.

(B-2) Operation of the Second Exemplary Embodiment

Next, detailed explanation follows regarding operation of frame transmission processing in the communication device 1A according to the second exemplary embodiment, with reference to the drawings.

Figure 6:
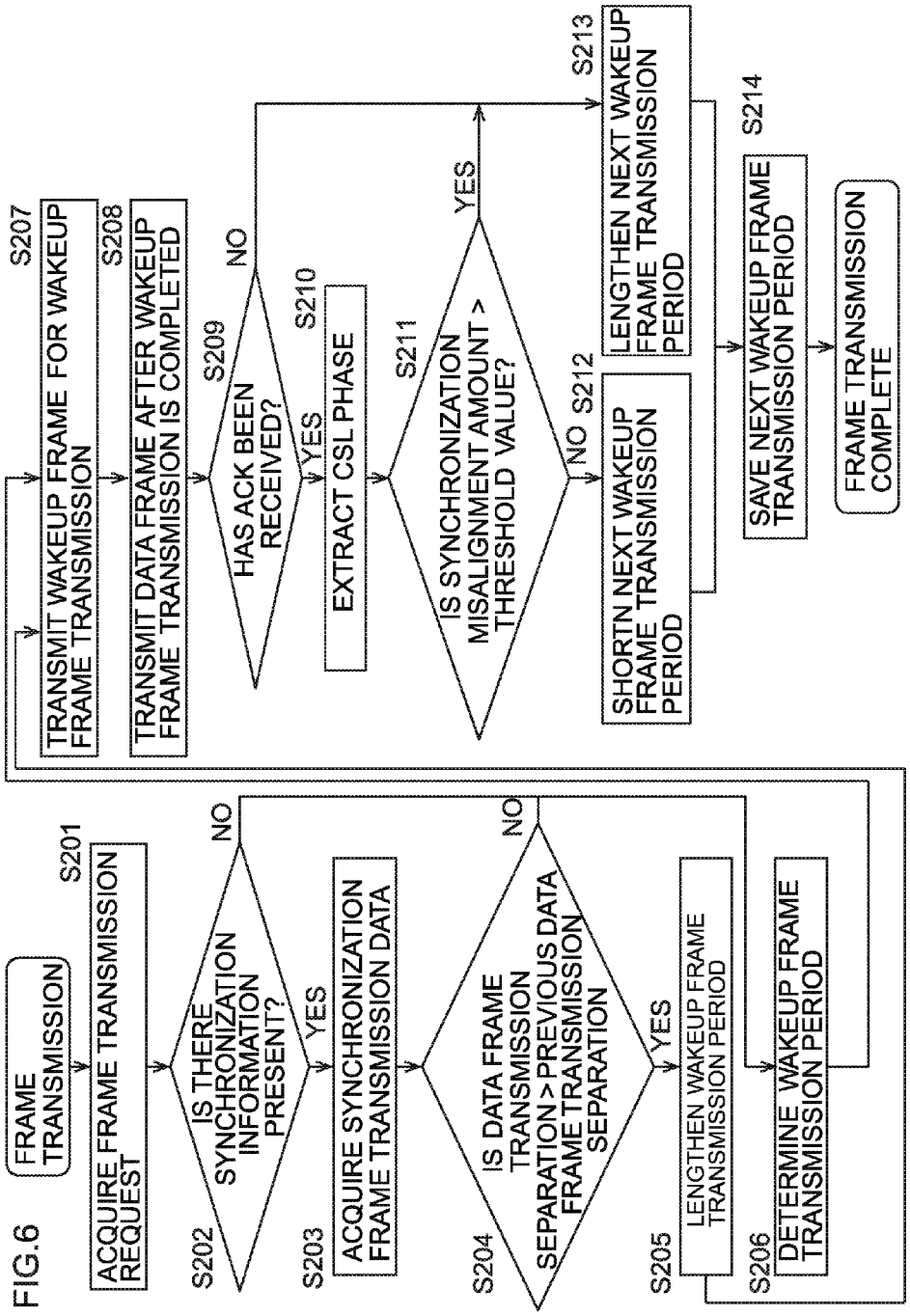
FIG. 6 is a flowchart illustrating operation of frame transmission processing in a communication device according to the second exemplary embodiment.

FIG. 6 is a flowchart illustrating operation of frame transmission processing in the communication device 1A according to the second exemplary embodiment. FIG. 6 illustrates operation of data frame transmission while changing the wakeup frame transmission period.

In FIG. 6, similarly to in the first exemplary embodiment, the communication controller 11 starts frame transmission processing for the destination node when there is a frame transmission request from the layer above.

Similarly to in the first exemplary embodiment, the destination address according to the frame transmission request is sent from the communication controller 11 to the synchronization frame transmission controller 14A (S201), and the synchronization frame transmission controller 14A searches for the presence or absence of the corresponding synchronization information in the synchronization information saving section 18 based on the acquired destination address (S202). Processing transitions to S203 if there is synchronization information, and processing transitions to step S206 if there is no synchronization information.

When there is synchronization information (a CSL phase) associated with the destination address in the synchronization information saving section 18, the synchronization frame transmission information corresponding to the destination address is acquired by the synchronization frame transmission controller 14A from the synchronization frame transmission information saving section 19 (S203). When this is performed, the synchronization frame transmission controller 14A takes the difference (time difference) between the previous data frame transmission timing (the transmission end timing) and the current data frame transmission timing (the next transmission end timing), and finds the previous transmission separation that is the time from when transmission of the previous data frame was completed until the transmission timing of the next data frame.

The previous transmission separation, the CSL phase acquired from the destination node, the transmission end timing, and the wakeup frame transmission period are associated with the address information of the destination node and saved in the synchronization frame transmission information saving section 19. The synchronization frame transmission controller 14A accordingly extracts the previous transmission separation, the CSL phase, the transmission end timing, and the wakeup frame transmission period from the read synchronization frame transmission information.

The synchronization frame transmission controller 14A compares the previous data frame transmission separation (previous transmission separation) saved in the synchronization information saving section 18 against the current data frame transmission separation (S204).

In cases in which the current data frame transmission separation is longer than the previous data frame transmission separation, the synchronization frame transmission controller 14A multiplies the previous wakeup frame transmission period by a predetermined value (for example, a predetermined value of "2") so as to lengthen the wakeup frame transmission period, so as to compute the next wakeup frame transmission period (S205).

Processing transitions to S206 when the current data frame transmission separation is shorter than the previous data frame transmission separation. At S206, the current wakeup frame transmission period is set to the same length of time as the previous wakeup frame transmission period. Namely, the wakeup frame transmission period saved in the synchronization information saving section 18 is taken as the current wakeup frame transmission period. Note that, similarly to in the first exemplary embodiment, the wakeup frame transmission period may be shorted by a predetermined period of time, or may be returned to the initial value. The present exemplary embodiment is an example of a case in which the previous wakeup frame transmission period is employed without modification.

The synchronization frame transmission controller 14A causes the frame generation section 16 to continuously transmit the wakeup frame for the wakeup frame transmission period computed at S204 (S207). After completing transmission of the wakeup frame, the synchronization frame transmission controller 14A passes a wakeup frame transmission complete notification to the communication controller 11, and the communication controller 11 requests transmission of a data frame from the frame generation section 16, and the data frame is transmitted (S208).

The communication controller 11 determines whether or not there has been an ACK frame response from the destination node during a predetermined period of time from after transmission of the data frame (S209). Processing transitions to S210 if an ACK frame has been received, and processing transitions to S213 if an ACK frame has not been received.

When the ACK frame has been received, the synchronization frame transmission controller 14A extracts the CSL phase included in the received ACK frame (S210), and updates the extracted CSL phase in the synchronization frame transmission information saving section 19.

At S211, the synchronization probability determination section 21 calculates from the CSL phase a synchronization misalignment amount (a period of time indicating the synchronization misalignment) expressing how much misalignment there is from a timing that maximizes synchronization. The synchronization probability determination section 21 compares the computed synchronization misalignment amount against the threshold value, and sends the comparison result to the synchronization frame transmission controller 14A (S211).

When the synchronization misalignment amount exceeds the threshold value, the synchronization frame transmission controller 14A multiplies the previous wakeup frame transmission period by a predetermined value so as to lengthen the next wakeup frame transmission period, and finds the next wakeup frame transmission period (S213).

On the other hand, when the synchronization misalignment amount is the threshold value or less, the synchronization frame transmission controller 14A sets the next wakeup frame transmission period to the initial value (S212). Note that here also, the next wakeup frame transmission period may be shorted in length by a predetermined period of time.

The synchronization probability determination section 21 may be configured so as to compare a single synchronization misalignment amount against the threshold value, however there is no limitation to a single synchronization misalignment amount, and a statistical computation may be performed on plural synchronization misalignment amounts (for example, an average value of plural synchronization misalignment amounts may be found), and configuration may be made such that this computation result (for example, the average value) is compared against the threshold value. Namely, rather than finding the wakeup frame transmission period using a single synchronization misalignment amount, the wakeup frame transmission period may be lengthened when the average value of plural amounts exceeds a threshold value.

Moreover, in computing the wakeup frame transmission period, as explained in the first exemplary embodiment, the wakeup frame transmission period may be changed according to the reception state of the ACK frame from the destination node. Namely, configuration may be made such that, when the ACK frame has not been received, the next wakeup transmission period is computed by multiplying the previous wakeup frame transmission period by a predetermined value so as to lengthen the next wakeup frame transmission period.

Figure 7:
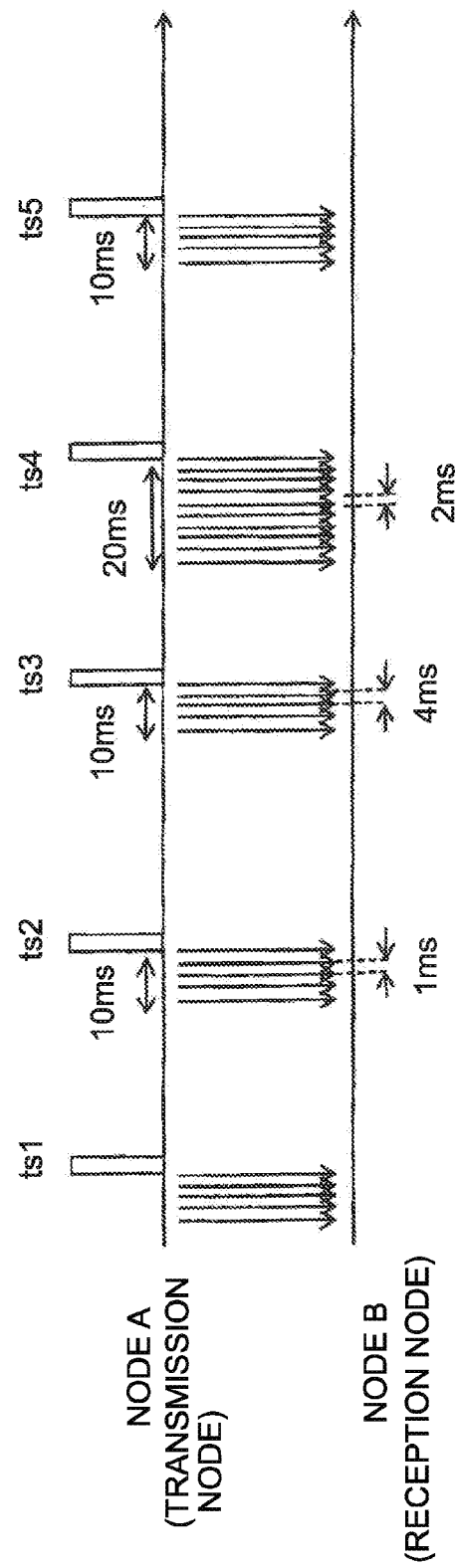
FIG. 7 is a first explanatory diagram to explain processing to change the wakeup frame transmission period according to the second exemplary embodiment.
Figure 8:
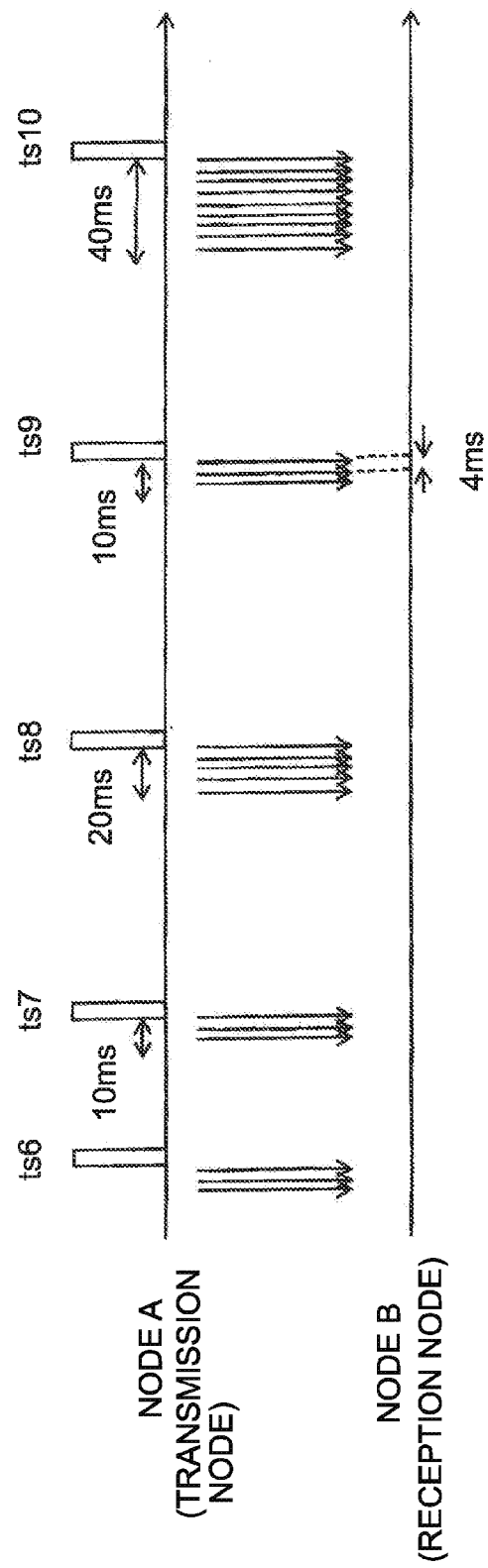
FIG. 8 is second explanatory diagram to explain processing to change the wakeup frame transmission period according to the second exemplary embodiment.

FIG. 7 and FIG. 8 are explanatory diagrams to explain processing to change the wakeup frame transmission period according to the second exemplary embodiment. FIG. 9 is an explanatory diagram to explain a configuration of synchronization frame transmission information for the reception node (node B) of the transmission node (node A) of FIG. 7 and FIG. 8.

An example is illustrated here in which the initial value of the wakeup frame transmission period is 10 milliseconds. Moreover, the threshold value to compare with the synchronization misalignment amount in this example is 3 milliseconds, and the length of the wakeup frame transmission period is doubled when the synchronization misalignment amount exceeds the threshold value (for example, 3 milliseconds).

Moreover, the wakeup frame transmission period is set to the initial value in cases in which the wakeup frame transmission period is longer than the initial value and the synchronization misalignment amount is the threshold value or lower.

FIG. 7 is illustrates an example of processing to change the wakeup frame transmission period between timing ts1 and timing ts5, and illustrates an example of a case in which the data frame is transmitted continuously within short periods of time. Namely, a previous transmission separation, which is the difference in time between the previous data frame transmission timing and the next data frame transmission timing, is an extremely short period of time, and is shown as blanks in FIG. 9. An example is illustrated of a case in which change of the wakeup frame transmission period according to the comparison result between the previous transmission separation and the predetermined value is not performed between timing ts1 and timing ts5.

The timing ts1 is an onset (first time) state after transition from an asynchronous communication mode to a synchronous communication mode. When this occurs, the synchronization frame transmission controller 14A does not write a value to the "previous transmission separation" of the synchronization frame transmission information. Moreover, when an ACK frame has not been received, since this is an onset state of the synchronous communication mode in which a value has not been written to the "CSL phase", the synchronization frame transmission controller 14A writes an initial value of 10 milliseconds to the next "wakeup frame transmission period" ("timing ts2") of FIG. 9.

At timing ts2, the synchronization frame transmission controller 14A reads the 10 milliseconds written to the "wakeup frame transmission period" of the "timing ts2" of FIG. 9, and the wakeup frame is transmitted by the frame generation section 16 during the interval of 10 milliseconds. Say the CSL phase included in the ACK frame received from the node B is 1 milliseconds, then the synchronization probability determination section 21 compares the CSL phase of 1 milliseconds against the threshold value (for example, 3 milliseconds). When doing so, due to the CSL phase being the threshold value or lower, the synchronization frame transmission controller 14A does not lengthen the next wakeup frame transmission period, and it remains at 10 milliseconds. Namely, the synchronization frame transmission controller 14A writes "1" to the "CSL phase" of the "timing ts2", and writes the initial value of 10 milliseconds to the next "wakeup frame transmission period" ("timing ts3").

At timing ts3, the synchronization frame transmission controller 14A reads the 10 milliseconds written to the "wakeup frame transmission period" of the "timing ts3" of FIG. 9, and the wakeup frame is transmitted by the frame generation section 16 during the interval of 10 milliseconds. Say the CSL phase included in the received ACK frame is then 4 milliseconds, the synchronization probability determination section 21 compares the 4 milliseconds CSL phase against the threshold value (for example, 3 milliseconds). When this is performed, since the CSL phase exceeds the threshold value, the synchronization frame transmission controller 14A multiplies the next wakeup frame transmission period by two to give 20 milliseconds. Namely, the synchronization frame transmission controller 14A writes "4" to the "CSL phase" of "timing ts3", and writes an initial value of 20 milliseconds to the next "wakeup frame transmission period" ("timing ts4").

At timing ts4, the synchronization frame transmission controller 14A reads the 20 milliseconds written to the "wakeup frame transmission period" of the "timing ts4" of FIG. 9, and the wakeup frame is transmitted by the frame generation section 16 during the interval of 20 milliseconds. At timing ts3, the synchronization misalignment amount is greater than the threshold value, indicating that the synchronization misalignment amount between the transmission node and the reception node becomes large. Thus the synchronization misalignment amount may be also large at the timing ts4, with the possibility arising that synchronization misalignment correction will not be performed correctly in the transmission node. Thus at timing ts4, reception of the wakeup frame by the reception node is facilitated by lengthening the wakeup frame transmission period.

When the CSL phase included in the received ACK frame is 2 milliseconds, the synchronization probability determination section 21 compares the 2 milliseconds CSL phase against the threshold value (for example, 3 milliseconds), and since the CSL phase is the threshold value or lower, the synchronization frame transmission controller 14A sets the next wakeup frame transmission period to the initial value of 10 milliseconds. Namely, the synchronization frame transmission controller 14A writes "2" to the "CSL phase" of the "timing ts4", and writes the initial value of 10 milliseconds to the next "wakeup frame transmission period" ("timing ts5").

At timing ts5, the synchronization frame transmission controller 14A reads the 10 milliseconds written to the "wakeup frame transmission period" of the "timing ts5" of FIG. 9, and the wakeup frame is transmitted by the frame generation section 16 during the interval of 10 milliseconds. When the CSL phase included in the received ACK frame is 0 milliseconds, due to the CSL phase being the threshold value or lower, the synchronization frame transmission controller 14A sets the next wakeup frame transmission period to the initial value of 10 milliseconds.

FIG. 8 illustrates an example of processing to change the wakeup frame transmission period between timing ts6 and timing ts10. This example is an example illustrating a case in which the previous transmission separation, which is the time difference between the previous data frame transmission timing and the current data frame transmission timing, is large.

At timing ts6, the synchronization frame transmission controller 14A finds the time difference (the previous transmission separation) between the transmission end timing (timing ts5) of the previous data frame and the data frame transmission timing (timing ts6). When this occurs, say the previous transmission separation is 30 minutes, then the synchronization frame transmission controller 14A writes "30" to the "previous transmission separation" of the "timing ts6" of FIG. 9. The synchronization frame transmission controller 14A reads 10 milliseconds written to the "wakeup frame transmission period" of the "timing ts6" of FIG. 9, and the wakeup frame is transmitted by the frame generation section 16 for the 10 millisecond duration. When there is no reception of the ACK frame, a value is not written to the "CSL phase", and the synchronization frame transmission controller 14A writes 10 milliseconds for the next "wakeup frame transmission period" ("timing ts7").

At timing ts7, the synchronization frame transmission controller 14A finds the time difference (the previous transmission separation) between the transmission end timing (timing ts6) of the previous data frame and the data frame transmission timing (timing ts7). When this occurs, say the previous transmission separation is 30 minutes, then the synchronization frame transmission controller 14A writes "30" to the "previous transmission separation" of the "timing ts7" of FIG. 9. The synchronization frame transmission controller 14A reads 10 milliseconds written to the "wakeup frame transmission period" of the "timing ts7" of FIG. 9. A comparison of the previous data frame transmission separation "30 minutes" (from timing ts5 to timing ts6) against the next data frame transmission separation "30 minutes" (from timing ts6 to timing ts7) shows that the next data frame transmission separation has not exceeded the previous data frame transmission separation. Thus in the synchronization frame transmission controller 14A, the wakeup frame is transmitted by the frame generation section 16 for the wakeup frame transmission period of "10 milliseconds". When the CSL phase included in the received ACK frame is "1", due to the CSL phase "1" being lower than the threshold value, the next wakeup frame transmission period is set to 10 milliseconds. Thus the synchronization frame transmission controller 14A writes "1" to the "CSL phase", and writes 10 milliseconds to the next "wakeup frame transmission period" ("timing ts8") of FIG. 9.

At timing ts8, the synchronization frame transmission controller 14A finds the time difference (the previous transmission separation) between the transmission end timing (timing ts7) of the previous data frame and the data frame transmission timing (timing ts8). When this occurs, say the previous transmission separation is 60 minutes, then the synchronization frame transmission controller 14A writes "60" to the "previous transmission separation" of the "timing ts8" of FIG. 9. The synchronization frame transmission controller 14A reads 10 milliseconds written to the "wakeup frame transmission period" of the "timing ts8" of FIG. 9. A comparison of the previous data frame transmission separation "30 minutes" (from timing ts6 to timing ts7) against the next data frame transmission separation "60 minutes" (from timing ts7 to timing ts8) shows that the next data frame transmission separation has exceeded the previous data frame transmission separation. Thus the synchronization frame transmission controller 14A multiplies the wakeup frame transmission period of "10 milliseconds" by "2", and doubles the length of the wakeup frame transmission period, and transmission of the wakeup frame is performed in the frame generation section 16 during the interval of 20 milliseconds. When the CSL phase included in the received ACK frame is "2", due to the CSL phase "2" being the threshold value or lower, 20 milliseconds is employed as the next wakeup frame transmission period. The synchronization frame transmission controller 14A then writes "2" to the "CSL phase", and writes 20 milliseconds to the next "wakeup frame transmission period" ("timing ts9") of FIG. 9.

At timing ts9, the synchronization frame transmission controller 14A finds the time difference (the previous transmission separation) between the transmission end timing (timing ts8) of the previous data frame and the data frame transmission timing (timing ts9). When this occurs, say the previous transmission separation is 60 minutes, then the synchronization frame transmission controller 14A writes "60" to the "previous transmission separation" of the "timing ts9" of FIG. 9. The synchronization frame transmission controller 14A reads 20 milliseconds written to the "wakeup frame transmission period" of the "timing ts9" of FIG. 9. A comparison of the data frame transmission separation "60 minutes" for the previous time (from timing ts7 to timing ts8) against the next data frame transmission separation "60 minutes" (from timing ts8 to timing ts9) shows that the next data frame transmission separation has not exceeded the previous data frame transmission separation. Thus in the synchronization frame transmission controller 14A the wakeup frame is transmitted by the frame generation section 16 during the interval of the wakeup frame transmission period "20 milliseconds". When the CSL phase included in the received ACK frame is "4", due to the CSL phase "4" exceeding the threshold value, 40 milliseconds is employed as the next wakeup frame transmission period. The synchronization frame transmission controller 14A then writes "4" to the "CSL phase", and writes 40 milliseconds for the next "wakeup frame transmission period" ("timing ts10") of FIG. 9.

At timing ts10, the synchronization frame transmission controller 14A finds the time difference (the previous transmission separation) between the transmission end timing (timing ts9) of the previous data frame and the data frame transmission timing (timing ts10). When this occurs, say the previous transmission separation is 90 minutes, then the synchronization frame transmission controller 14A writes "90" to the "previous transmission separation" of the "timing ts10" of FIG. 9. The synchronization frame transmission controller 14A reads 40 milliseconds written to the "wakeup frame transmission period" of the "timing ts10" of FIG. 9. A comparison of the previous data frame transmission separation "60 minutes" (from timing ts8 to timing ts9) against the next data frame transmission separation "90 minutes" (from timing ts9 to timing ts10) shows that the next data frame transmission separation has exceeded the previous data frame transmission separation. Thus in the synchronization frame transmission controller 14A, "2" is multiplied by the wakeup frame transmission period "40 milliseconds" so as to double the length of the period of time of the wakeup frame transmission period such that the wakeup frame transmission period is set to 80 milliseconds, and transmission of the wakeup frame is performed in the frame generation section 16 during the interval of "80 milliseconds". When the CSL phase included in the received ACK frame is "0", due to the CSL phase "0" not exceeding the threshold value, the next wakeup frame transmission period is set to 80 milliseconds. The synchronization frame transmission controller 14A then writes "0" to the "CSL phase", and writes 80 milliseconds for the next "wakeup frame transmission period".

As described above, according to the second exemplary embodiment, configuration may be made such that the wakeup frame transmission period for the next frame transmission period is determined from the relationship between the frame transmission separation leading up to the previous time and the synchronization misalignment. When there is low reliability for synchronization misalignment correction, reception by the receiver is facilitated by lengthening the wakeup frame transmission period, raising the probability of maintaining synchronous communication.

Moreover, according to the second exemplary embodiment, when the determination reliability of synchronization misalignment determination is high compared to the threshold value, the power saving ability can be raised and the network load lowered by shortening the wakeup frame transmission period, while maintaining high reception probability.

(C) Other Exemplary Embodiments

It has been stated that various modified embodiments of the present disclosure may be implemented for each of the exemplary embodiments described above, and the following modified embodiments are also applicable to the present disclosure.

(C-1) Explanation has been given in each of the exemplary embodiments described above of examples in which frame transmission processing is performed that is compatible with intermittent communication that switches between an asynchronous communication mode and a synchronous communication mode. However there is no limitation thereto, and application may be made to a communication device capable of switching between a CSL mode and a non-CSL mode.

Moreover, the present disclosure may be applied not only to a CSL mode, but also to communication method in which transmission is performed for synchronization frames other than in data frame transmission.

(C-2) Explanation has been given in each of the exemplary embodiments described above of examples in which the wakeup frame transmission period is changed, however, the transmission period for a frame including a wakeup frame and a data frame (namely, a frame commonly employed as both a wakeup frame and a data frame) may be changed.

(C-3) Description has not been given in the second exemplary embodiment described above of changing the next wakeup frame transmission period according to the presence or absence of ACK frame reception as in the first exemplary embodiment, however, the changes to the wakeup frame transmission period of the first exemplary embodiment may also be made in the second exemplary embodiment.

Moreover, in the second exemplary embodiment described above, examples have been given of cases in which the next wakeup frame transmission period is changed according to the synchronization misalignment amount, and cases in which the wakeup frame transmission period is changed according to the data frame transmission separation, however, it is sufficient to include one of these functions.

(C-4) Explanation has been given in each of the exemplary embodiments described above of examples of cases in which the wakeup frame transmission period is changed to the initial value when shortening the wakeup frame transmission period. Since there is a high probability that synchronization with the corresponding node has been achieved during the previous data frame transmission, the wakeup frame transmission period is shortened in order to achieve a shorter wakeup frame transmission period. Therefore, there is no limitation to changing to the initial value Moreover, when lengthening the wakeup frame transmission period, in each of the exemplary embodiments described above, examples have been given of cases in which an integer value was employed as the predetermined value to multiply the current wakeup frame transmission period by. This is performed since synchronization has not been achieved during the previous data frame transmission, under the assumption that synchronization will also not be achieved in the current data frame transmission. Thus as long as the wakeup frame transmission period can be lengthened so as to enable synchronization to be achieved with the corresponding node, a predetermined computation equation may be employed, or a value other than an integer value may be employed.

What is claimed is:

1. A communication device comprising:
a communication controller that causes a control frame, which is a frame employed for the purpose of achieving synchronization, to be transmitted during a control frame transmission period, which is a period of time in which the control frame transmission is permitted, to a transmission destination of a data frame such that the data frame is transmitted after transmission of the control frame has completed, the communication controller configured to control the communication device to continuously transmit the control frame for the control frame transmission period;
memory defining a control frame transmission information saving section that saves information including at least the control frame transmission period in which the control frame was transmitted, and a transmission result of the data frame, for respective destination addresses; and
a control frame transmission controller that references the information saved in the control frame transmission information saving section, and determines the control frame transmission period for when to transmit the next control frame, based on the control frame transmission period from the past and the data frame transition result, wherein a response frame to the data frame is a frame transmitted by another communication device of a transmission destination,
the communication device is configured to receive the response frame from the another communication device of the transmission destination,
the control frame transmission controller changes the next control frame transmission period based on information included in the response frame indicating a misalignment amount between a transmission timing of the control frame and a reception timing at which the another communication device of the transmission destination receives the control frame, and
the control frame transmission controller changes the next control frame transmission period so as to be longer than the control frame transmission period immediately prior to the next control frame transmission period in cases in which the misalignment amount exceeds a threshold value.

2. The communication device of claim 1, wherein the control frame transmission controller changes the control frame transmission period for when to transmit the next control frame according to whether or not transmission of the previous data frame succeeded.

3. The communication device of claim 1, wherein:
the control frame transmission controller changes the next control frame transmission period so as to be shorter than the control frame transmission period immediately prior to the next control frame transmission period in cases in which the misalignment amount is the threshold value or lower.

4. The communication device of claim 1, wherein:
the control frame transmission information saving section saves a data frame transmission timing indicating the time the data frame was transmitted; and
the control frame transmission controller references the data frame transmission timing saved in the control frame transmission information saving section, and changes the next control frame transmission period based on a transmission separation from the data frame transmission timing when the previous data frame was transmitted, up to the current data frame transmission timing.

5. The communication device of claim 4, wherein:
the control frame transmission controller changes the next control frame transmission period so as to be longer than the control frame transmission period immediately prior to the next control frame transmission period in cases in which the transmission separation exceeds a threshold value.

6. The communication device of claim 4, wherein:
the control frame transmission controller changes the next control frame transmission period so as to be shorter than the control frame transmission period immediately prior to the next control frame transmission period in cases in which the transmission separation is a threshold value or lower.

7. The communication device of claim 6, wherein:
the control frame transmission controller sets the next control frame transmission period to the threshold value in cases in which the transmission separation is the threshold value or lower.

8. The communication device of claim 1, wherein:
the control frame transmission controller determines a frame transmission period including the control frame and the data frame.

9. The communication device of claim 1, wherein:
the communication device transmits and receives the data frame, a response frame, and/or the control frame according to an intermittent reception method.

10. The communication device of claim 1, wherein:
the control frame transmission information saving section saves the information for respective destination addresses each time the data frame is transmitted.

11. The communication device of claim 1, wherein:
the misalignment amount included in the response frame is found based on a comparison of a reception expected timing when it is expected that the another communication device of a transmission destination will receive the control frame, and an actual timing of the timing at which the another communication device of the transmission destination actually received the control frame; and
the misalignment amount is a coordinated sampled listening (CSL) phase.

12. A non-transitory computer-readable medium recorded with a communication program comprising instructions for execution by a control portion of a communication device, the instructions comprising:
transmitting a control frame, which is a frame employed for the purpose of achieving synchronization, during a control frame transmission period, which is a period of time in which the control frame transmission is permitted, to a transmission destination of a data frame, and transmitting the data frame after transmission of the control frame has completed;
continuously transmitting the control frame for the control frame transmission period;
receiving a frame transmitted by another communication device of the transmission destination;
saving information including at least the control frame transmission period in which the control frame was transmitted, and a transmission result of the data frame, for respective destination addresses;
referencing the information saved in the control frame transmission information saving section, and determining the control frame transmission period for when transmitting the next control frame, based on the control frame transmission period from the past and the data frame transition result;
receiving a response frame, which is a frame transmitted by the another communication device of a transmission destination;
changing the next control frame transmission period based on information included in the response frame indicating a misalignment amount between a transmission timing of the control frame and a reception timing at which the another communication device of the transmission destination receives the control frame; and
changing the next control frame transmission period so as to be longer than a control frame transmission period immediately prior to the next control frame transmission period in cases in which the misalignment amount exceeds a threshold value.

13. A communication method comprising:
transmitting a control frame, which is a frame employed for the purpose of achieving synchronization, during a control frame transmission period, which is a period of time in which the control frame transmission is permitted, to a transmission destination of a data frame, and transmitting the data frame after transmission of the control frame has completed;
continuously transmitting the control frame for the control frame transmission period;
receiving a frame transmitted by a communication device of the transmission destination;
saving information including at least the control frame transmission period in which the control frame was transmitted, and a transmission result of the data frame, for respective destination addresses, in a control frame transmission information saving section of memory;
referencing the information saved in the control frame transmission information saving section, and determining the control frame transmission period for when transmitting the next control frame, based on the control frame transmission period from the past and the data frame transition result;
receiving a response frame, which is a frame transmitted by the communication device of a transmission destination;
changing the next control frame transmission period based on information included in the response frame indicating a misalignment amount between a transmission timing of the control frame and a reception timing at which the communication device of the transmission destination receives the control frame; and
changing the next control frame transmission period so as to be longer than a control frame transmission period immediately prior to the next control frame transmission period in cases in which the misalignment amount exceeds a threshold value.

14. A communication device comprising:
a communication controller that causes a control frame, which is a frame employed for the purpose of achieving synchronization, to be transmitted during a control frame transmission period, which is a period of time in which the control frame transmission is permitted, to a transmission destination of a data frame such that the data frame is transmitted after transmission of the control frame has completed, the communication controller configured to control the communication device to continuously transmit the control frame for the control frame transmission period;
memory defining a control frame transmission information saving section that saves information including at least the control frame transmission period in which the control frame was transmitted, and a transmission result of the data frame, for respective destination addresses; and
a control frame transmission controller that references the information saved in the control frame transmission information saving section, and determines the control frame transmission period for when to transmit the next control frame, based on the control frame transmission period from the past and the data frame transition result,
wherein a response frame to the data frame is a frame transmitted by another communication device of a transmission destination,
the communication device is configured to receive the response frame from the another communication device of the transmission destination,
the control frame transmission controller changes the next control frame transmission period based on information included in the response frame indicating a misalignment amount between a transmission timing of the control frame and a reception timing at which the another communication device of the transmission destination receives the control frame, and the control frame transmission controller changes the next control frame transmission period so as to be shorter than the control frame transmission period immediately prior to the next control frame transmission period in cases in which the misalignment amount is the threshold value or lower.

* * * * *